United States Patent
Hatfield et al.

(10) Patent No.: US 9,682,679 B2
(45) Date of Patent: Jun. 20, 2017

(54) AIRBAG INFLATOR RETAINERS AND RELATED METHODS AND SYSTEMS

(71) Applicant: Autoliv ASP, Inc., Ogden, UT (US)

(72) Inventors: Mark S. Hatfield, Providence, UT (US); Bradley Scott Maxfield, Smithfield, UT (US); Derrick Staheli, South Ogden, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 75 days.

(21) Appl. No.: 14/455,741

(22) Filed: Aug. 8, 2014

(65) Prior Publication Data

US 2016/0039381 A1     Feb. 11, 2016

(51) Int. Cl.
B60R 21/217     (2011.01)

(52) U.S. Cl.
CPC ................... B60R 21/217 (2013.01)

(58) Field of Classification Search
CPC ............................ B60R 21/217; B60R 21/261
USPC ....................................................... 280/728.2
See application file for complete search history.

(56) References Cited

U.S. PATENT DOCUMENTS

| | | | |
|---|---|---|---|
| 3,772,062 A | 11/1973 | Shur et al. | |
| 3,843,010 A | 10/1974 | Morse et al. | |
| 3,874,544 A | 4/1975 | Harmon | |
| 3,969,812 A | 7/1976 | Beck | |
| 4,640,312 A | 2/1987 | Patell et al. | |
| 4,810,005 A | 3/1989 | Fohl | |
| 4,835,975 A | 6/1989 | Windecker | |
| 4,865,210 A | 9/1989 | Brainard, II | |
| 4,877,264 A * | 10/1989 | Cuevas | B60R 21/30 280/731 |
| 4,913,461 A | 4/1990 | Cuevas | |
| 4,982,870 A | 1/1991 | Van Loon | |
| 5,028,070 A | 7/1991 | Bender | |
| 5,062,367 A | 11/1991 | Hayashi et al. | |
| 5,100,171 A | 3/1992 | Faigle et al. | |

(Continued)

FOREIGN PATENT DOCUMENTS

| | | | |
|---|---|---|---|
| DE | 20308650 | 10/2003 | |
| DE | 102009006077 | 7/2010 | |
| DE | WO 2013135490 A1 * | 9/2013 | ........... B60R 21/217 |

OTHER PUBLICATIONS

Concise Explanation of Relevance of DE102009006077.

(Continued)

*Primary Examiner* — Karen Beck
(74) *Attorney, Agent, or Firm* — Phillips Ryther & Winchester; Matthew D. Thayne

(57) ABSTRACT

Apparatus, methods, and systems for retaining an airbag inflator within a vehicle airbag system, such as within an airbag module housing of a vehicle airbag system. In some embodiments, an inflator comprising an inflator base positioned at a first end of the inflator and a diffuser positioned at a second end of the inflator opposite from the first end may be inserted, or configured for insertion into, an opening in a housing. An inflator retainer comprising a retainer opening configured to receive the diffuser therethrough may be coupled with the inflator at the second end of the inflator and used to secure the inflator to the housing with the inflator base positioned through the housing opening and the diffuser positioned through the retainer opening.

14 Claims, 12 Drawing Sheets

(56) References Cited

U.S. PATENT DOCUMENTS

| | | | | |
|---|---|---|---|---|
| 5,199,740 A | * | 4/1993 | Frantom | B60R 21/272 280/736 |
| 5,264,059 A | | 11/1993 | Jacaruso et al. | |
| 5,277,442 A | | 1/1994 | Cuevas | |
| 5,340,148 A | | 8/1994 | Faigle et al. | |
| 5,350,188 A | * | 9/1994 | Sato | B60R 21/233 280/739 |
| 5,350,190 A | * | 9/1994 | Szigethy | B60R 21/2037 200/61.55 |
| 5,382,046 A | | 1/1995 | Cuevas | |
| 5,388,858 A | | 2/1995 | Cuevas | |
| 5,409,256 A | * | 4/1995 | Gordon | B60R 21/2035 280/728.2 |
| 5,423,568 A | | 6/1995 | Zushi et al. | |
| 5,425,548 A | * | 6/1995 | Rasmussen | B60R 21/217 280/728.2 |
| 5,427,406 A | | 6/1995 | Zushi et al. | |
| 5,490,690 A | | 2/1996 | Mihm | |
| 5,492,364 A | | 2/1996 | Anderson et al. | |
| 5,501,484 A | | 3/1996 | Saderholm et al. | |
| 5,511,818 A | * | 4/1996 | Jarboe | B60R 21/217 280/728.2 |
| 5,547,213 A | | 8/1996 | Lang et al. | |
| 5,577,763 A | * | 11/1996 | Cuevas | B60R 21/217 280/728.2 |
| 5,613,700 A | | 3/1997 | Hiramitsu et al. | |
| 5,615,907 A | * | 4/1997 | Stanger | B60R 21/217 280/728.2 |
| 5,671,946 A | | 9/1997 | Whalen et al. | |
| 5,743,558 A | | 4/1998 | Seymour | |
| 5,788,274 A | | 8/1998 | Gunn | |
| 5,791,682 A | * | 8/1998 | Hiramitsu | B60R 21/217 280/728.2 |
| 5,884,936 A | | 3/1999 | Matsu et al. | |
| 5,931,491 A | | 8/1999 | Bosgeiter et al. | |
| 6,042,147 A | * | 3/2000 | Nishijima | B60R 21/217 280/731 |
| 6,145,872 A | | 11/2000 | Soderquist et al. | |
| 6,149,184 A | | 11/2000 | Ennis et al. | |
| 6,183,003 B1 | | 2/2001 | Matsuhashi et al. | |
| 6,328,332 B1 | * | 12/2001 | Schutz | B60R 21/217 280/728.2 |
| 6,361,064 B1 | | 3/2002 | Hopf et al. | |
| 6,409,209 B2 | * | 6/2002 | Amamori | 280/728.2 |
| RE38,494 E | | 4/2004 | Kirker et al. | |
| 6,802,193 B1 | | 10/2004 | Long | |
| 7,063,348 B2 | | 6/2006 | Webber et al. | |
| 7,147,124 B2 | | 12/2006 | Minta et al. | |
| 7,175,894 B2 | | 2/2007 | Nakamura | |
| 7,293,794 B2 | | 11/2007 | Clarke et al. | |
| 7,384,064 B2 | | 6/2008 | Thomas et al. | |
| 7,438,315 B2 | | 10/2008 | Blackburn | |
| 7,516,983 B2 | | 4/2009 | Suehiro et al. | |
| 7,597,353 B2 | | 10/2009 | Smith et al. | |
| 7,637,528 B2 | * | 12/2009 | Shimazaki | B60Q 5/003 280/728.2 |
| 7,905,516 B2 | | 3/2011 | Bostick et al. | |
| 8,297,653 B2 | | 10/2012 | Smith | |
| 9,216,710 B2 | * | 12/2015 | Smith | B60R 21/217 |
| 9,421,939 B2 | * | 8/2016 | Smith | B60R 21/217 |
| 2004/0061315 A1 | | 4/2004 | Schneider | |
| 2004/0235378 A1 | | 11/2004 | Byma et al. | |
| 2005/0194768 A1 | | 9/2005 | Bonam et al. | |
| 2005/0225064 A1 | | 10/2005 | Suehiro et al. | |
| 2006/0060325 A1 | | 3/2006 | Gordon et al. | |
| 2006/0066083 A1 | * | 3/2006 | Keutz | B60R 21/2035 280/731 |
| 2006/0267322 A1 | | 11/2006 | Eckelberg | |
| 2007/0063495 A1 | * | 3/2007 | Saito | B60R 21/2644 280/736 |
| 2007/0125488 A1 | | 6/2007 | Brisson et al. | |
| 2007/0132218 A1 | | 6/2007 | Kim et al. | |
| 2009/0051146 A1 | | 2/2009 | Bosch | |
| 2011/0169254 A1 | | 7/2011 | Bert | |
| 2012/0112438 A1 | | 5/2012 | Soderquist et al. | |
| 2012/0217728 A1 | | 8/2012 | Jackson et al. | |
| 2012/0234839 A1 | | 9/2012 | Smith et al. | |
| 2012/0235392 A1 | | 9/2012 | Smith | |
| 2013/0200600 A1 | | 8/2013 | Bierwirth et al. | |
| 2014/0144343 A1 | | 5/2014 | Smith et al. | |
| 2015/0307050 A1 | * | 10/2015 | Smith | B60R 21/217 280/728.2 |
| 2015/0353046 A1 | * | 12/2015 | Smith | B60R 21/217 280/728.2 |
| 2015/0353048 A1 | * | 12/2015 | Young | B60R 21/217 280/728.3 |
| 2016/0039381 A1 | * | 2/2016 | Hatfield | B60R 21/217 280/728.2 |
| 2016/0214559 A1 | * | 7/2016 | Ukita | B60R 21/2171 |
| 2016/0257278 A1 | * | 9/2016 | Fudamoto | B60R 21/264 |

OTHER PUBLICATIONS

DE20308650—Machine Translation of Application.
International Search Report for PCT/US2015/026909, Jul. 15, 2015, 2 pgs.
Written Opinion for PCT/US15/026909, Jul. 15, 2015, 7 pgs.

* cited by examiner

AIRBAG INFLATOR RETAINERS AND RELATED METHODS AND SYSTEMS

SUMMARY

Apparatus, methods, and systems are disclosed herein for retaining an airbag inflator within a vehicle airbag system, such as within an airbag module housing of a vehicle airbag system. Some embodiments may be particularly suited to retaining a flangeless inflator within such a housing.

In a more particular example of a vehicle airbag assembly according to certain embodiments, the assembly may comprise a housing comprising a housing opening and a plurality of tab openings. The tabs may be configured to be bent against the housing and/or twisted after being received in the tab openings to secure the inflator between the housing and the retainer piece. The assembly may further comprise an inflator comprising an inflator base positioned at a first end of the inflator and a diffuser positioned at a second end of the inflator opposite from the first end. In some embodiments, the inflator may comprise a flangeless inflator. The inflator base may be configured to be received in the housing opening, and may be configured to extend at least partially through the housing opening such that at least a portion of the inflator base extends out of the housing opening. The inflator base may comprise a collar having an at least substantially cylindrical shape and may house an initiator therein.

Some inflator bases may comprise a flat surface to assist in desired orientation of the base with respect to one or more other components. For example, some embodiments may comprise a "D-shaped" inflator base. Such bases should still be considered at least substantially cylindrical for purposes of this disclosure.

A retainer piece may also be provided that may be configured to fit over the inflator at the second end of the inflator and secure the inflator to the housing with the inflator base positioned through the housing opening. The retainer piece may comprise a retainer piece opening configured to receive the diffuser and a plurality of tabs configured to be received in the tab openings to secure the inflator in place between the housing and the retainer piece.

In some embodiments, the retainer piece opening may be configured to allow the diffuser to pass therethrough such that the entire diffuser extends through and outside of the retainer piece.

In another example of an embodiment of a vehicle airbag assembly, the assembly may comprise an airbag cushion comprising an airbag cushion opening, a first frame member positioned within the airbag cushion, and a second frame member positioned outside of the airbag cushion. The first frame member may comprise a first frame member opening. The assembly may further comprise an inflator, a housing, and a fabric retainer positioned in between the inflator and the airbag cushion such that the inflator is at least partially received within the first frame member opening. In some embodiments, the inflator may comprise an inflator base positioned at a first end of the inflator and a diffuser positioned at a second end of the inflator opposite from the first end. The fabric retainer may be configured to secure the inflator with respect to the housing during deployment of the inflator.

In some embodiments, the fabric retainer may comprise a fabric retainer opening. The fabric retainer opening may be configured to receive a diffuser of the inflator.

Some embodiments may further comprise a flap positioned over the fabric retainer opening that may be configured to open to expose the diffuser to an interior of the airbag cushion upon deployment of the inflator. In some embodiments, the flap may be attached to the fabric retainer. The flap may comprise a weakened portion configured to separate upon deployment of the inflator to expose the diffuser to an interior of the airbag cushion.

In some embodiments, the fabric retainer opening may be smaller than the airbag cushion opening. The fabric retainer opening may be positioned concentrically with respect to the airbag cushion opening.

In some embodiments, the fabric retainer may comprise a plurality of slots configured to receive a corresponding plurality of fastening members extending through the airbag cushion. The plurality of slots may allow the inflator to nest within and extend into the airbag cushion opening a predetermined amount according to the length of the slots. In some embodiments, the plurality of slots may be configured to allow the inflator to move with respect to the housing during installation. This may be useful to allow for accommodating the inflator and to prevent interference between various components of an airbag assembly, such as steering wheel, an armature, locking nut, locking bolt, and the like.

In some embodiments, the plurality of slots may comprise four slots angled away from a center of the fabric retainer opening. In some such embodiments, two of the plurality of slots may extend at least substantially along a first line, and another two of the plurality of slots may extend at least substantially along a second line. The first line may be at least substantially perpendicular to the second line.

In yet another example of an embodiment of a vehicle airbag assembly, the assembly may comprise a housing comprising a housing opening, an inflator comprising an inflator base positioned at a first end of the inflator and a diffuser positioned at a second end of the inflator opposite from the first end. The inflator base may be configured to be received in the housing opening and the inflator base may be configured to extend at least partially through the housing opening such that at least a portion of the inflator base extends out of the housing opening. A retainer comprising a retainer opening configured to receive the diffuser therethrough may be provided. The retainer may be configured to fit over the inflator at the second end of the inflator and secure the inflator to the housing with the inflator base positioned through the housing opening and the diffuser positioned through the retainer opening.

In some embodiments, the retainer may comprise a fabric retainer. Alternatively, the retainer may comprise a retainer piece made up of a rigid material.

The housing may comprise an airbag module housing. The housing may further comprise a plurality of tab openings, and the retainer piece may comprise a plurality of tabs configured to be received in the tab openings to secure the inflator in place between the housing and the retainer piece.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
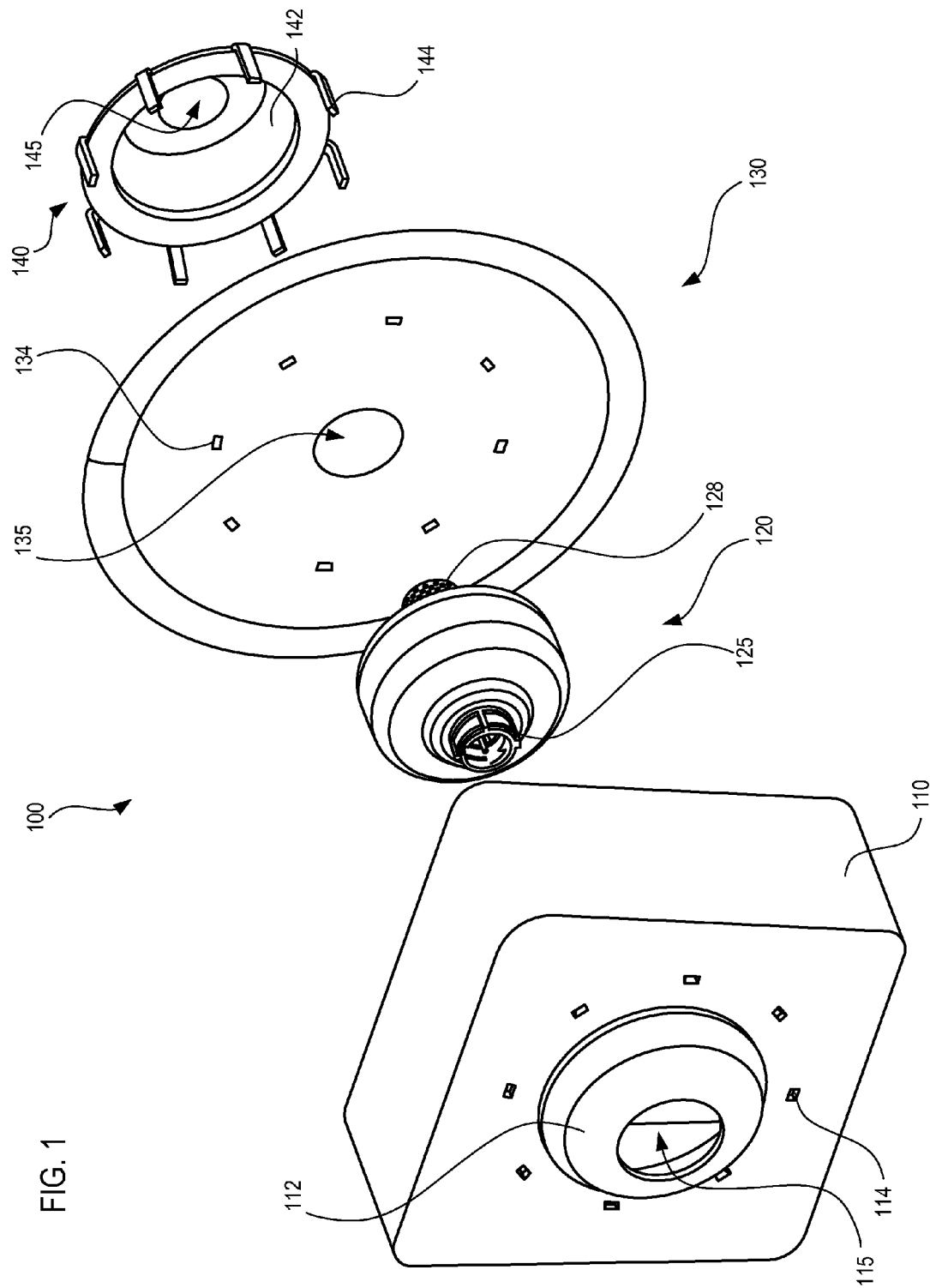
FIG. 1 depicts an exploded view of an airbag assembly for a vehicle according to one embodiment.

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems, apparatus, and methods disclosed herein relate to coupling an airbag inflator with an airbag module housing, an adapter configured to be coupled with an airbag module housing, and/or another component of a vehicle airbag system, and/or otherwise preventing an airbag inflator from being forced into an airbag cushion during deployment. In some embodiments, various techniques and/or structures are disclosed that may be used to facilitate coupling an inflator comprising a base, such as a collar, with an airbag module housing, an adapter configured to be coupled with an airbag module housing, and/or another component of a vehicle airbag system and/or otherwise preventing an airbag inflator from being forced into an airbag cushion.

In some preferred embodiments, the inflator may comprise an inflator comprising a composite fiber overwrap. Such inflators are disclosed, for example, in U.S. Pat. No. 8,297,653 titled "Pyrotechnic Inflator with Composite Overwrap," the entire contents of which are hereby incorporated by reference herein. In some embodiments, the inflator may comprise a flangeless inflator. Some embodiments disclosed herein may be particularly useful in conjunction with airbag assemblies comprising flangeless inflators comprising a top diffuser that is radial, rather than an inflator comprising a radial center diffuser as is commonly used in many current driver airbag inflators. A "top diffuser" as used herein refers to the location of the diffuser on the inflator, rather than the direction of diffusion. For example, a top diffuser may diffuse gas along one or more portions of a side surface, rather than a top surface, or the diffuser. More particularly, some embodiments may be particularly useful to retainer inflators comprising a diffuser at one end and a base, which base may house an initiator, at an opposite end, and comprising an at least substantially spherical or ellipsoid shape in between the diffuser and the base/initiator.

In some embodiments, a shell member of the inflator comprising a metal, such as drawn steel or aluminum, for example, may comprise a thickness that is less than conventional pyrotechnic pressure vessel housings. For example, whereas conventional pyrotechnic pressure vessel housings are commonly 2 to 3 mm thick, by providing an overwrap, metal shell members having a thickness of less than 1 mm, and in some cases less than 0.5 mm, may be used. In alternative embodiments, the shell member may instead, or additionally, comprise a plastic material. In some embodiments, the shell member may be incapable of withstanding the pressure generated within the combustion chamber of the inflator upon reaction of the pyrotechnic material contained therein without the support provided by the overwrap.

In some embodiments, an end cap may be provided comprising a molded plastic with at least a portion of an initiator integrally molded therein. For example, in some embodiments, a glass-filled nylon, such as 33% glass-filled nylon 6/12, may be used. One or more metal inserts may be included to improve the structural capability of the end cap if desired. In other embodiments, the end cap may comprise a cast or machined metal, such as aluminum, with the initiator crimped or molded in position therein. In some embodiments, the shell member and the end cap may be joined together by crimping the shell member over the end cap.

Various embodiments disclosed herein may also be useful in that they may allow for retaining the inflator without using stud fasteners on the inflator itself and/or without associated diffuser rings. Similarly, the use of a diffuser ring in the airbag cushion may be avoided.

Additional details of certain embodiments and implementations will now be discussed in greater detail in connection with the accompanying figures. FIG. 1 depicts an embodiment of a vehicle airbag assembly 100. Vehicle airbag assembly 100 comprises a housing 110 comprising an opening 115. Housing 110 comprises an airbag module housing 110. However, other embodiments are contemplated in which the housing may instead comprise an adapter configured for coupling to an airbag module housing.

Opening 115 is positioned on a recess 112 of housing 110. Recess 112 comprises a hemispherical shape that, as depicted in FIG. 1, at least substantially matches a shape of an inflator 120 that may also be part of airbag assembly 100. Of course, a wide variety of alternative shapes, such as oval, square, etc., may be used in other embodiments. Recess 112, as also depicted in FIG. 1, protrudes from an exterior surface of housing 110. Of course, a wide variety of alternative embodiments are contemplated. For example, some embodiments may comprise a recess comprising a different shape, some embodiments may comprise a recess that does not protrude from an exterior surface of the housing, and some embodiments may lack such a recess entirely.

Housing 110 further comprises a plurality of openings 114 positioned concentrically about central opening 115.

Although the depicted embodiment comprises eight such openings 114, a wide variety of alternative embodiments are contemplated having other numbers of openings. Similarly, although openings 114 are depicted positioned apart from recess 112, other embodiments are contemplated in which such openings may alternatively, or additionally, be positioned within recess 112.

Vehicle airbag assembly 100 further comprises an inflator 120. Inflator 120 comprises a flangeless inflator comprising a base 125 at one end and a diffuser 128 at the opposite end. Although many traditional inflators include flanges and/or studs for mounting to an airbag module housing, many of the embodiments disclosed herein, including assembly 100, may be particularly useful in connection with such flangeless inflators that may lack such mounting features. Base 125 comprises a collar configured to be received in opening 115 of housing 110. Base 125 comprises an at least substantially cylindrical shape having an at least substantially circular cross-sectional shape, although a wide variety of alternative base shapes are possible. Base 125 is configured to extend at least partially through opening 115 such that at least a portion of the base 125 extends out of opening 115 when airbag assembly 100 is fully assembled. In some embodiments, base 125 may comprise a metal collar. In some embodiments, base 125 may be configured to at least partially house an initiator within the base 125. In some such embodiments, base 125 may fully house an initiator therein. As such, it may be desirable to form collar base 125 from a rigid, protective material, such as a metal or metal composite material. However, other embodiments are contemplated in which at least a portion of collar base 125 comprises another material, such as a thermoplastic material.

Inflator 120 may further comprises one or more poka yoke or error proofing features that may facilitate coupling between inflator 120 and housing 110 at one or more particular, positions and/or configurations. For example, some embodiments may comprise a flange configured to fit within a groove formed within opening 115. By aligning such a flange with such a groove, airbag assembly 100 may be configured such that inflator 120 may only be engaged with housing 110 at one rotational position (or, in some embodiments, a plurality of discrete rotational positions) relative to housing 110.

Vehicle airbag assembly 100 further comprises an airbag cushion 130, which may be positioned within housing 110. Inflator 120 may be positioned adjacent to airbag cushion 130. As shown in FIG. 1, airbag cushion 130 may comprise an opening 135 that may be configured to receive a diffuser 128 of inflator 120 in an assembled configuration.

Figure 2:
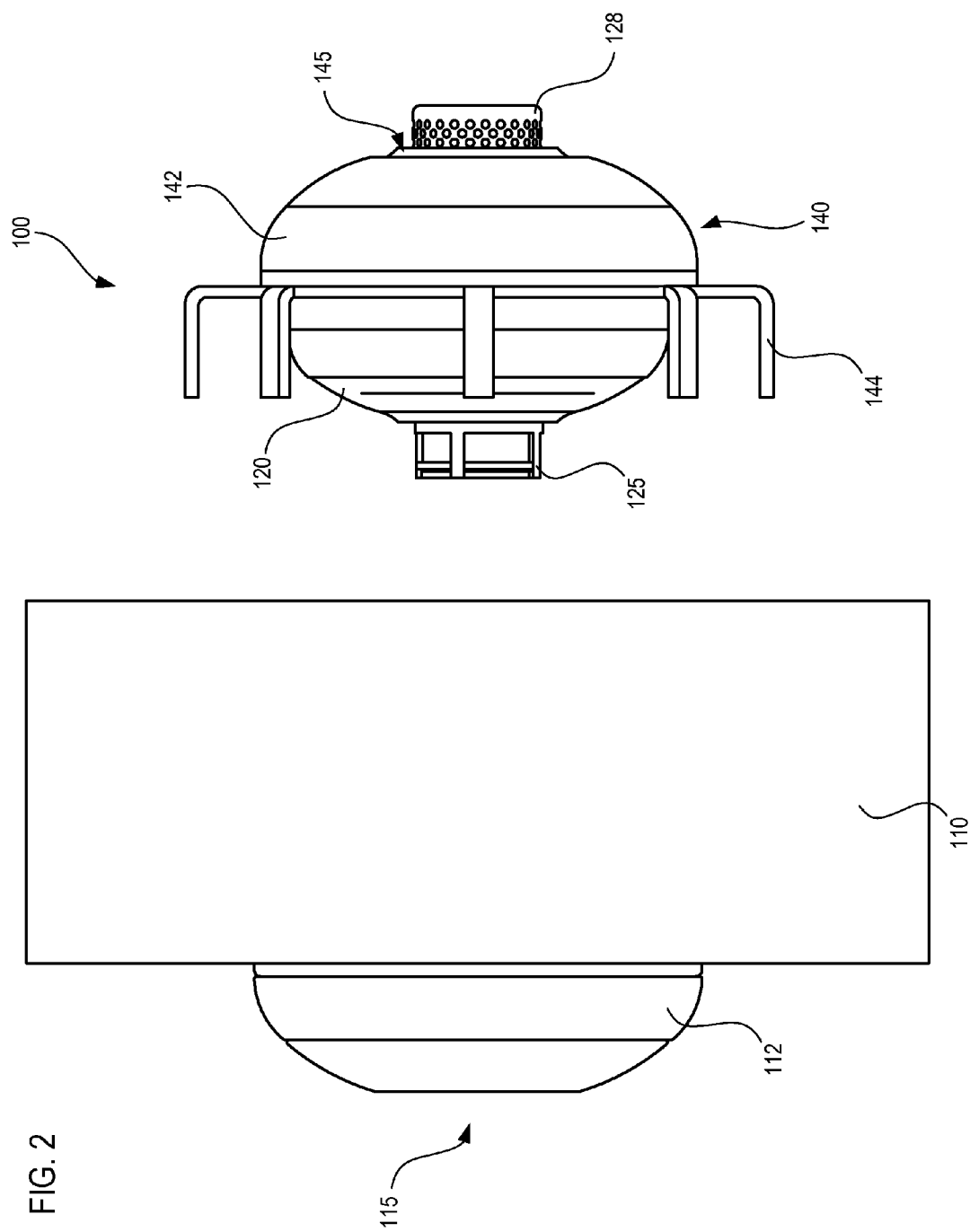
FIG. 2 is an elevation view depicting the airbag assembly of FIG. 1 after an inflator retainer has been coupled with an airbag inflator.

Vehicle airbag assembly 100 further comprises a retainer 140 configured to facilitate securing inflator 120 to housing 110 and/or to secure airbag cushion 130 to housing 110 and/or inflator 120. In some embodiments, such as the embodiment depicted in FIGS. 1 and 2, the retainer 140 may function as an inflator retainer in the module and may also function as a cushion retainer so as to secure these three components together inside of an airbag module housing or other such housing. Alternatively, inflator 120 may be positioned within airbag cushion 130 and base 125 may extend through opening 135 in an assembled configuration.

In the depicted embodiment, retainer 140 comprises a retaining plate 140. Retaining plate 140 comprises a plurality of tabs 144 corresponding with the plurality of openings 114 positioned in housing 110. Thus, each of the tabs 144 may be configured to be received in a respective opening 114 in order to secure inflator 120 with respect to housing 110 and to prevent base 125 from being withdrawn from opening 115. In some embodiments, each of the tabs 144 may be shaped identically. Alternatively, one or more of the tabs 144 may have a different shape and/or size, and a corresponding one or more of the openings 114 may have a corresponding different shape and/or size relative to the other openings in order to serve as an orientation/poka yoke, or other such feature to allow for error proofing during assembly. Such an error proofing feature may be used to force coupling between the inflator 120 and the housing 110 at one or more particular rotational orientations and/or prevent undesired errors in such orientations during assembly.

Airbag cushion 130 may also comprise a plurality of openings 134 positioned about opening 135 corresponding to openings 114 and/or tabs 144. As such, tabs 144 may extend through openings 134 and openings 114 to secure airbag cushion 130 in between inflator 120 and retaining plate 140 (or, alternatively, between inflator 120 and housing 110) to secure the various components together within housing 110 during assembly. In some embodiments, tabs 144 may be bent or crimped against housing 110 during assembly to facilitate such securement. Alternatively, one or more such tabs may be hook-shaped or otherwise formed with a shape to facilitate such securement without additional bending/crimping, as discussed in greater detail below.

Although the number of tabs (eight tabs 144 are shown in the embodiment of FIG. 1) provided may vary in accordance with desired applications, uses, and deployment characteristics, providing a relatively large number of tabs, such as is shown in the embodiment of FIG. 1, may provide for an even distribution of stress on housing 110, particularly relative to many common inflators in use that point load the studs associated with the inflator. It may be desirable to also provide for even spacing between the tabs.

Retaining plate 140 further comprises a central opening 145 for receiving diffuser 128 of inflator 120. In the depicted embodiment, diffuser 128 is fully received through opening 145 such that the entire diffuser 128 is positioned outside of retainer 140. However, other embodiments are contemplated in which this need not be the case.

Retainer 140 also comprises a shaped portion 142 configured to receive and mate with a corresponding portion of inflator 120. Shaped portion 142 comprises a bowl shape that may be configured to match the shape of a side of inflator 120 such that retainer 140 can mate with and secure inflator 120 by maximizing surface area contact between inflator 120 and retainer 140. Providing a matching shape to retain inflator 120 may be useful to reduce point loading, evenly distribute deployment loads, and/or reduce vibration and/or unnecessary noise during deployment.

In alternative embodiments, retainer 140 may instead comprise a ring configured to fit over inflator 120 and may lack a shaped portion. Preferably, in such embodiments, the ring comprises a central opening having a diameter less than the diameter of inflator 120 such that it can be secured to inflator 120 without inflator 120 passing entirely through such opening. Embodiments in which retainer 140 comprises a ring with tabs, rather than a shaped portion or pocket, are described in greater detail below.

Figure 3:
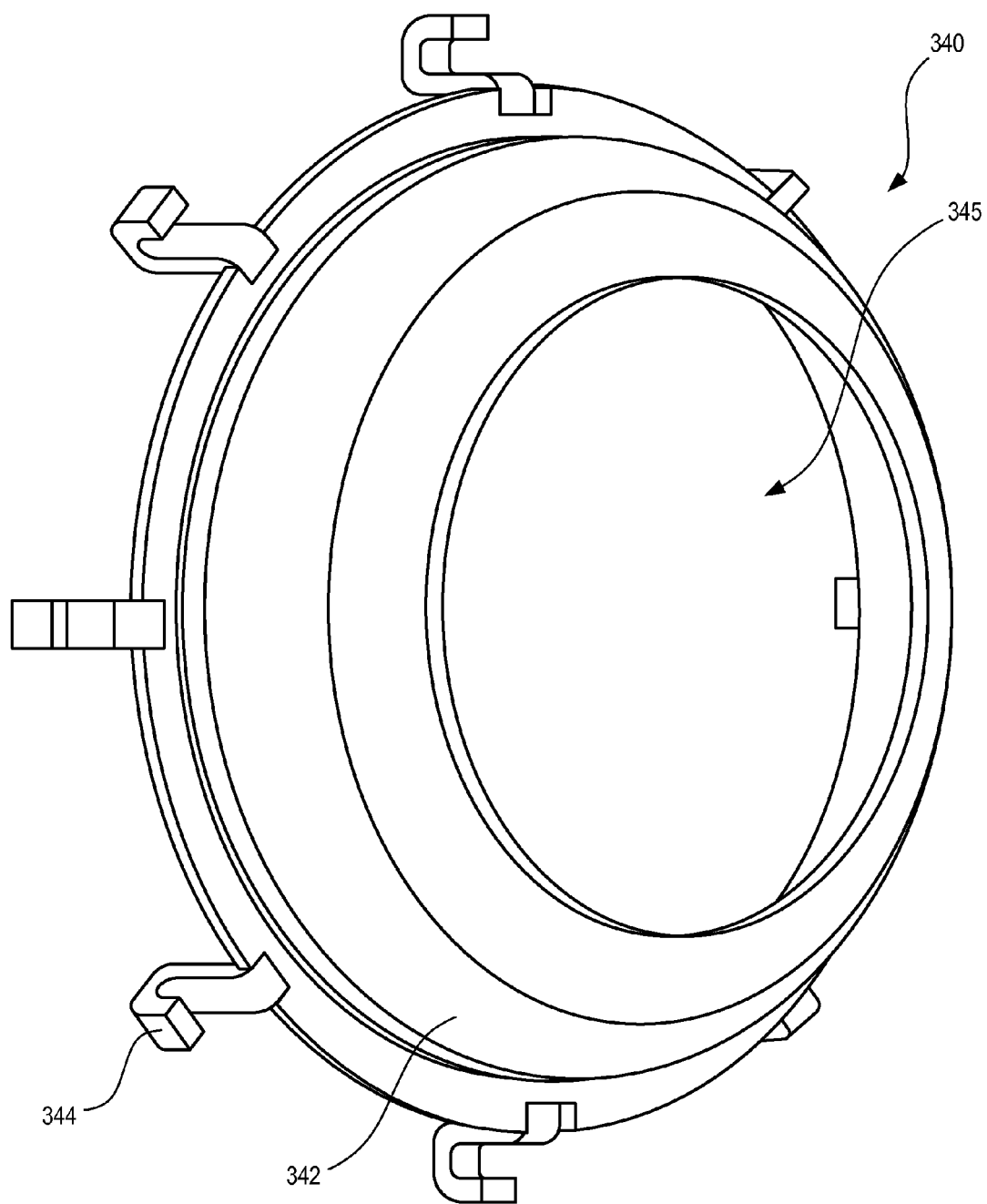
FIG. 3 depicts a perspective view of an alternative embodiment of an inflator retainer.

For example, FIG. 3 depicts an alternative embodiment of a retainer 340 comprising a central opening 345. Retainer 340 comprises a plurality of tabs 344 positioned concentrically about central opening 345. However, instead of the straight tabs 144 of retainer 140, tabs 344 comprise preformed hooks. In some embodiments, such hooks may be flexible so as to accommodate positioning tabs 344 through a corresponding plurality of openings in a secure manner. In still other embodiments, one tab 344, or a selected subset of tabs 344, may comprise a hook shape and the rest of tabs 344 may lack such a hook. In this manner, the hook-shaped tab(s) may be inserted first during assembly to facilitate securing the tabs with a housing or other structure comprising openings for receiving such tabs.

Alternatively, in some embodiments, tabs 344 may comprise preformed hooks that are rigid, rather than flexible. With respect to such embodiments, one or more openings (not shown in FIG. 3) may be formed in the housing, such as is depicted in FIG. 1. However, if tabs 344 are rigid, these housing openings may comprise one or more openings that are larger than tabs 344. After being inserted into such opening(s), tabs 344 may be rotated to wedge or engage a locking mechanism to secure tabs 344 in place and prevent twisting and/or loosening during assembly and/or use.

Retainer 340 also comprises a shaped portion 342, which may comprise a bowl-shaped portion. However, opening 345 may be much larger than needed to accommodate an associated diffuser (not shown in FIG. 3) or other component of an inflator. In addition, as mentioned above, some embodiments of retainers may lack a shaped portion and may instead simply comprise a narrow band configured to engage a periphery of a portion of an associated inflator. Some embodiments may comprise a band that defines a full circle or other closed loop. However, alternative embodiments are contemplated in which the retainer may be secured to an inflator without comprising a closed circle/loop, provided sufficiently rigid materials are used to form the retainer.

Figure 4:
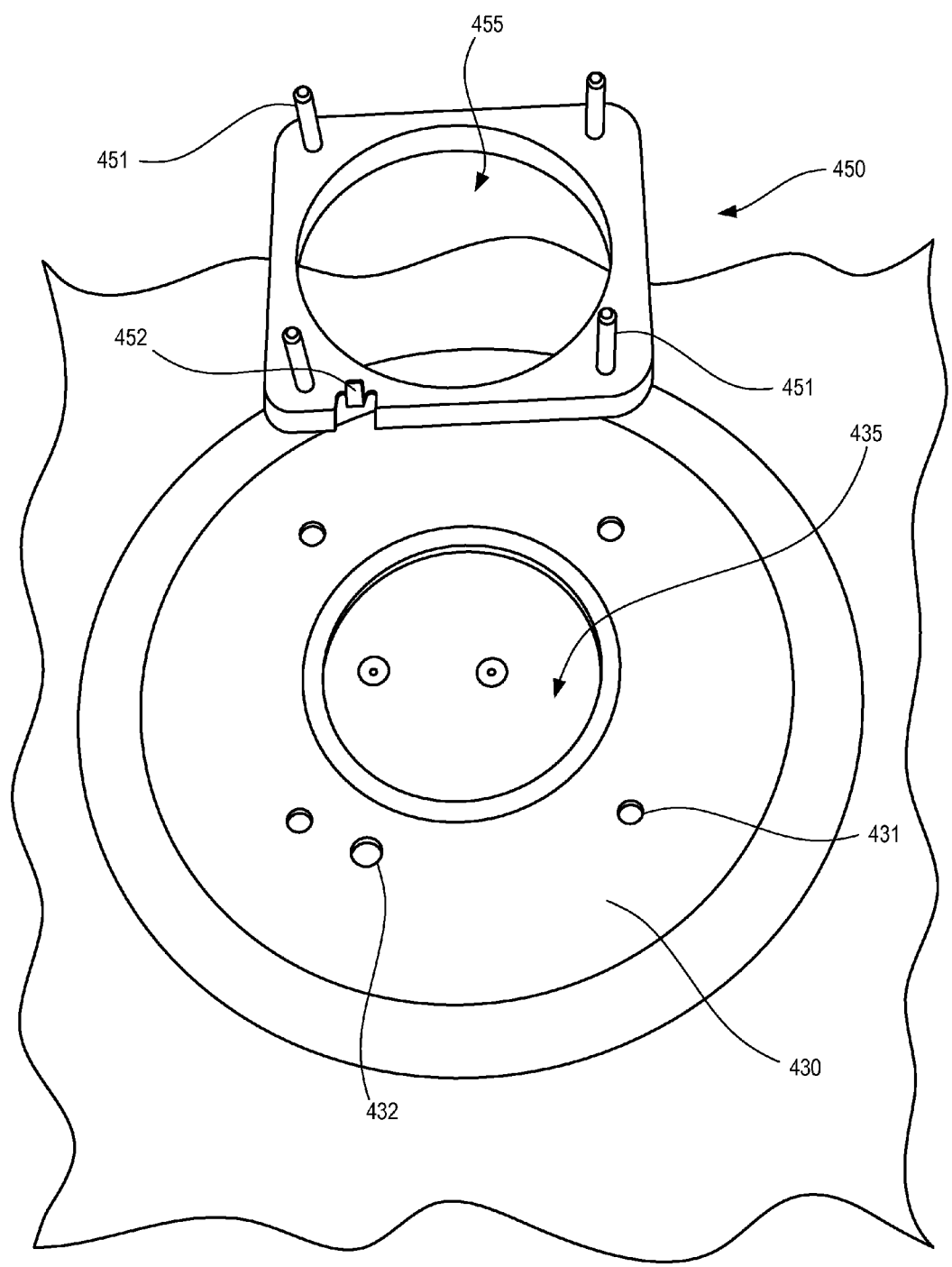
FIGS. 4-10 depict various steps in a process for assembly of an alternative embodiment of a vehicle airbag assembly.

FIGS. 4-10 depict various steps in a process for assembly of an alternative embodiment of a vehicle airbag assembly 400. FIG. 4 depicts a portion of an airbag cushion 430 comprising an airbag cushion opening 435. Airbag cushion 430 further comprises a plurality of fastener openings 431 and a poka yoke opening 432 positioned about airbag cushion opening 435.

Vehicle airbag assembly 400 may further comprise a first frame member 450. First frame member 450 comprises four fastener members comprising studs 451 and a poka yoke member 452. Studs 451 are configured to be received in fastener openings 431 and poka yoke member 452 is configured to be received in poka yoke opening 432 to ensure a proper orientation between first frame member 450 and airbag cushion 430. First frame member 450 further comprises a central opening 455. Preferably, central opening 455 is larger than opening 435 in airbag cushion 430 so that a portion of the airbag cushion material defining opening 435 may be secured by an inflator, as discussed in greater detail below.

Figure 5:
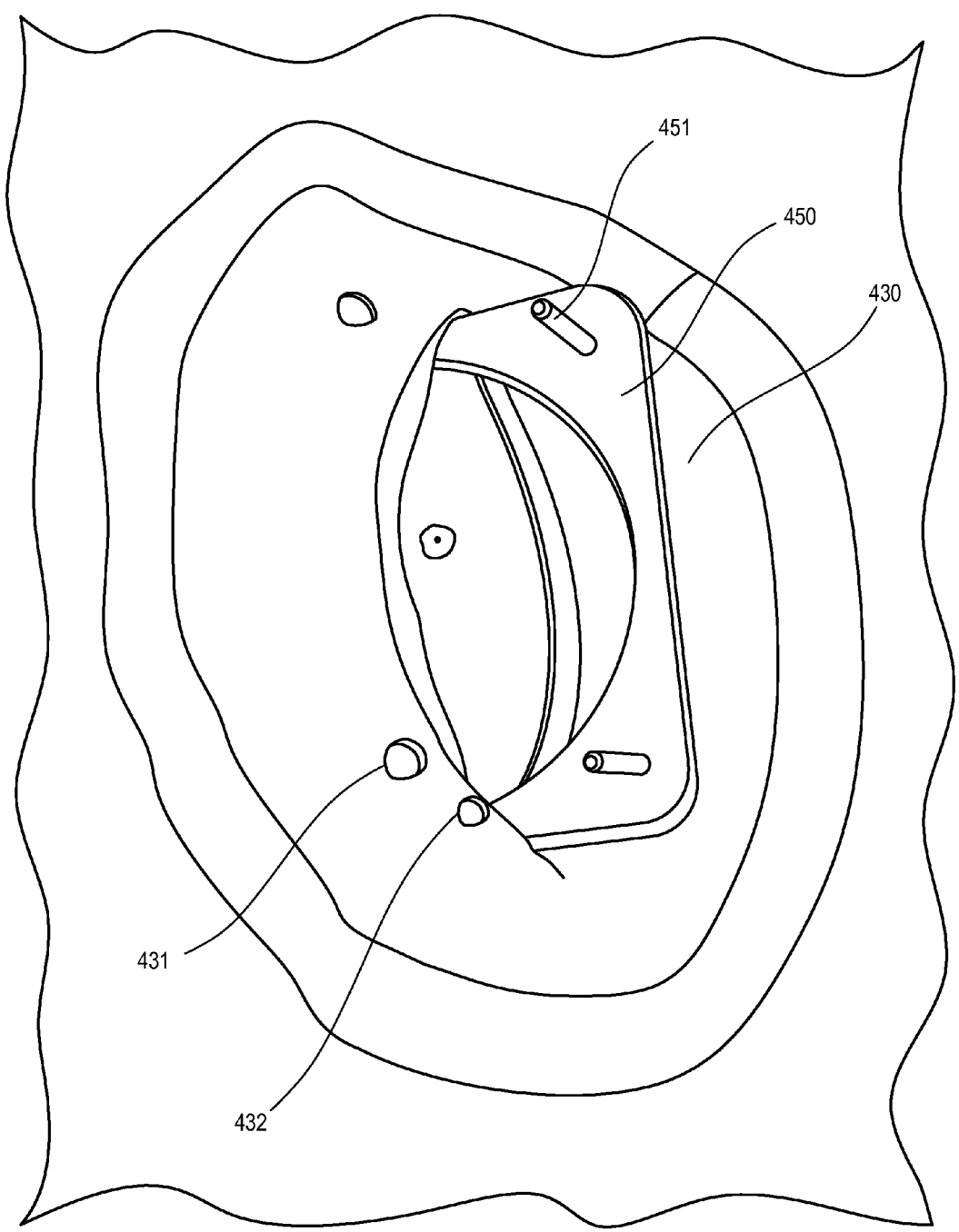

As shown in FIG. 5, first frame member 450 may be inserted into opening 435. Alternatively, airbag cushion 430 may be sewn or otherwise constructed around first frame member 450 if desired.

Figure 6:
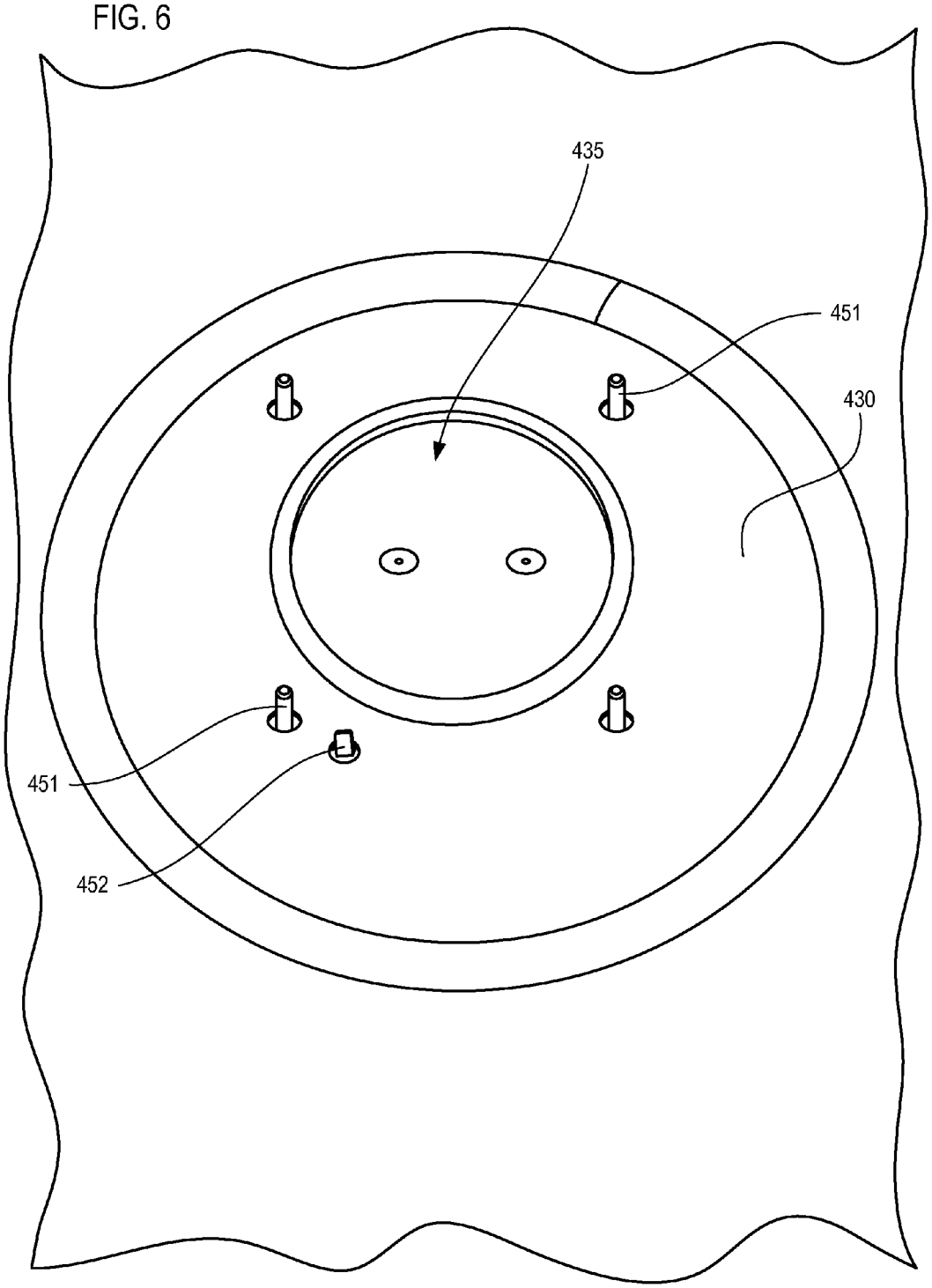

FIG. 6 depicts first frame member 450 positioned within airbag cushion 430. As shown in this figure, each of the various studs/fasteners 451 extend through openings 431 in airbag cushion 430 and poka yoke member 452 extends through poka yoke opening 432. Also, because the opening 455 defined by first frame member 450 is larger than the opening 435 in airbag cushion 430, the portion of first frame member 450 defining opening 455 is not visible in FIG. 6.

Figure 7:
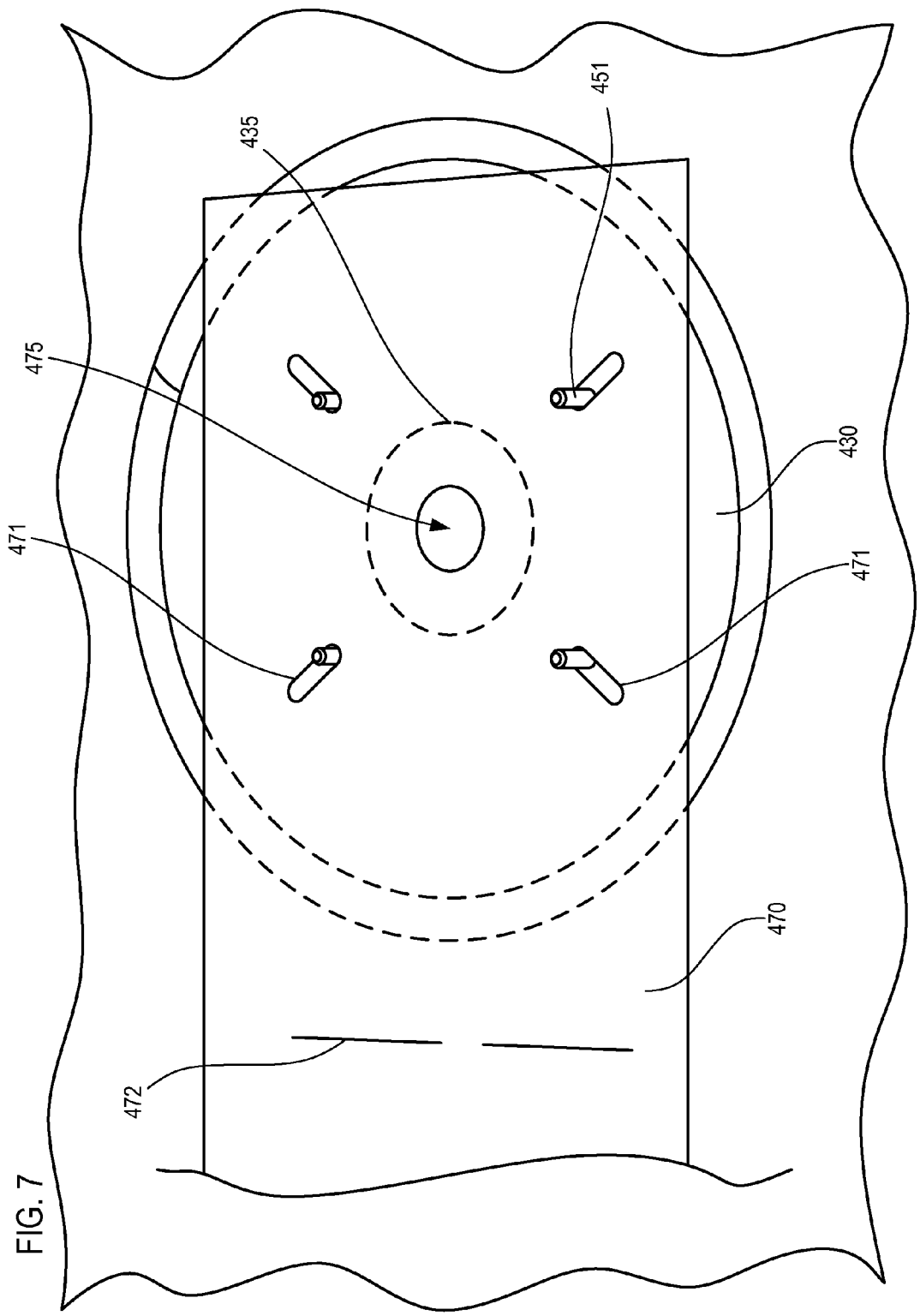

After first frame member 450 has been inserted or otherwise manufactured or positioned within airbag cushion 430, a flexible retainer 470 may be positioned over opening 435 in airbag cushion 430, as depicted in FIG. 7. In the depicted embodiment, flexible retainer 470 comprises a fabric retainer. A wide variety of fabric types may be suitable, including but not limited to those having a linear density of about 350 decitex or about 470 decitex. Preferably, the fabric is sufficiently strong to withstand deployment forces anticipated for the particular application.

In other embodiments, flexible retainer 470 may comprise another suitable material, such as plastic, strong paper, or another material with similar properties. In some embodiments, flexible retainer 470 may comprise a coating, such as silicone or another heat-absorbing material. Such coating(s) may be applied to one or both sides of the fabric or other type of flexible retainer 470. Such coating(s) may, for example, be applied at between about 25 g/m$^2$ and about 120 g/m$^2$.

Flexible retainer 470 may comprise a flap or strap, as shown in FIG. 7. Flexible retainer 470 may comprise a separate piece that may be indirectly coupled with airbag cushion 430, as also shown in FIG. 7. Alternatively, in other embodiments, flexible retainer 470 may be sewn or otherwise directly coupled with an airbag cushion. In some embodiments, flexible retainer 470 may be pre-formed as part of an airbag cushion.

In some embodiments, flexible retainer 470 may extend around airbag cushion 430 to form a loop. In such embodiments, a weakened portion 472 may be formed in one or more portions of the flexible retainer 470 to facilitate desired tearing/breaking of flexible retainer 470 during deployment. Thus, in some embodiments, flexible retainer 470 may be added to or otherwise incorporated into an existing strap that may be used to control deployment dynamics.

However, alternative embodiments may comprise a shape, such as a square shape, configured to only cover opening 435. For example, in the embodiment depicted in FIG. 7, fabric retainer 470 may be cut to form a square, or any other suitable shape that extends beyond and covers opening 435 and fasteners/studs 451 but does not extend around the entire airbag cushion 430.

Fabric retainer 470 may comprise a central opening 475 and a plurality of elongated slots 471 extending away from a center of central opening 475. Slots 471 may be configured to receive studs 451 and may allow for an inflator, as discussed below, to nest within and extend into opening 435 in airbag cushion 430 by a predetermined amount according to the length of the slots. In other words, providing slots 471 may allow fabric retainer 470 to slide or otherwise move on studs 451 to allow for such desired nesting.

Thus, making slots 471 longer will allow for an inflator of airbag assembly 400 to be inserted further into airbag cushion 435. Similarly, if it is desired to make an inflator rest more in the housing, slots 471 could be made shorter and/or moved in position to provide for the desired nesting of a flangeless inflator. In other words, slots 471 may be "tunable" to allow for positioning the inflator in an airbag module as needed. This may allow for a "taller" inflator or any inflator to be positioned and secured in an airbag module as desired.

For example, proper tuning may allow an inflator to move or be adjusted in the module during assembly, such as to allow room in the steering wheel or other part of an airbag configuration for an armature, locking nut, locking bolt, or another component of an airbag assembly and to prevent interference between the various components. Otherwise stated, the plurality of slots 471 may be configured to allow an inflator, such as a flangeless inflator, to move with respect to a housing during installation.

Although four slots 471 are depicted in the embodiment of FIG. 7, other embodiments are contemplated in which other numbers of slots may be formed within flexible retainer 470. Preferably, however, the slots are positioned in a symmetrical manner with respect to airbag cushion opening 435. For example, fabric retainer 470 comprises four slots 471 that are each angled away from a center of fabric retainer opening 475, which itself may be configured to be positioned concentrically within opening 435 of airbag cushion 430. Opening 475 is also preferably smaller than opening 435 so as to allow a diffuser 428 of a flangeless inflator 420 to extend through opening 475 but capture and retain a portion of inflator 420 surrounding diffuser 428.

In the depicted embodiment, two of the plurality of slots 471 extend at least substantially along a first line, and another two of the plurality of slots 471 extend at least substantially along a second line perpendicular to the first line. This allows a flangeless inflator to partially extend into airbag cushion 430 but be retained from extending too far therein by fabric retainer 470. Thus, fabric retainer 470 may be positioned in between an inflator (such as inflator 420 shown in FIG. 9) and airbag cushion 430 such that inflator 420 is at least partially received within opening 455 of first frame member 450 and such that fabric retainer 470 is configured to secure inflator 420 with respect to a housing, such as an airbag module housing or an adapter housing configured to facilitate coupling with an airbag module housing, during deployment of inflator 420.

However, as mentioned above, a variety of alternative embodiments are contemplated. For example, any number of elongated slots may be positioned about a center and/or center opening of a flexible/fabric retainer. Preferably, the elongated slots extend radially from a center of such an opening or from a particular central location on the retainer.

Figure 8:
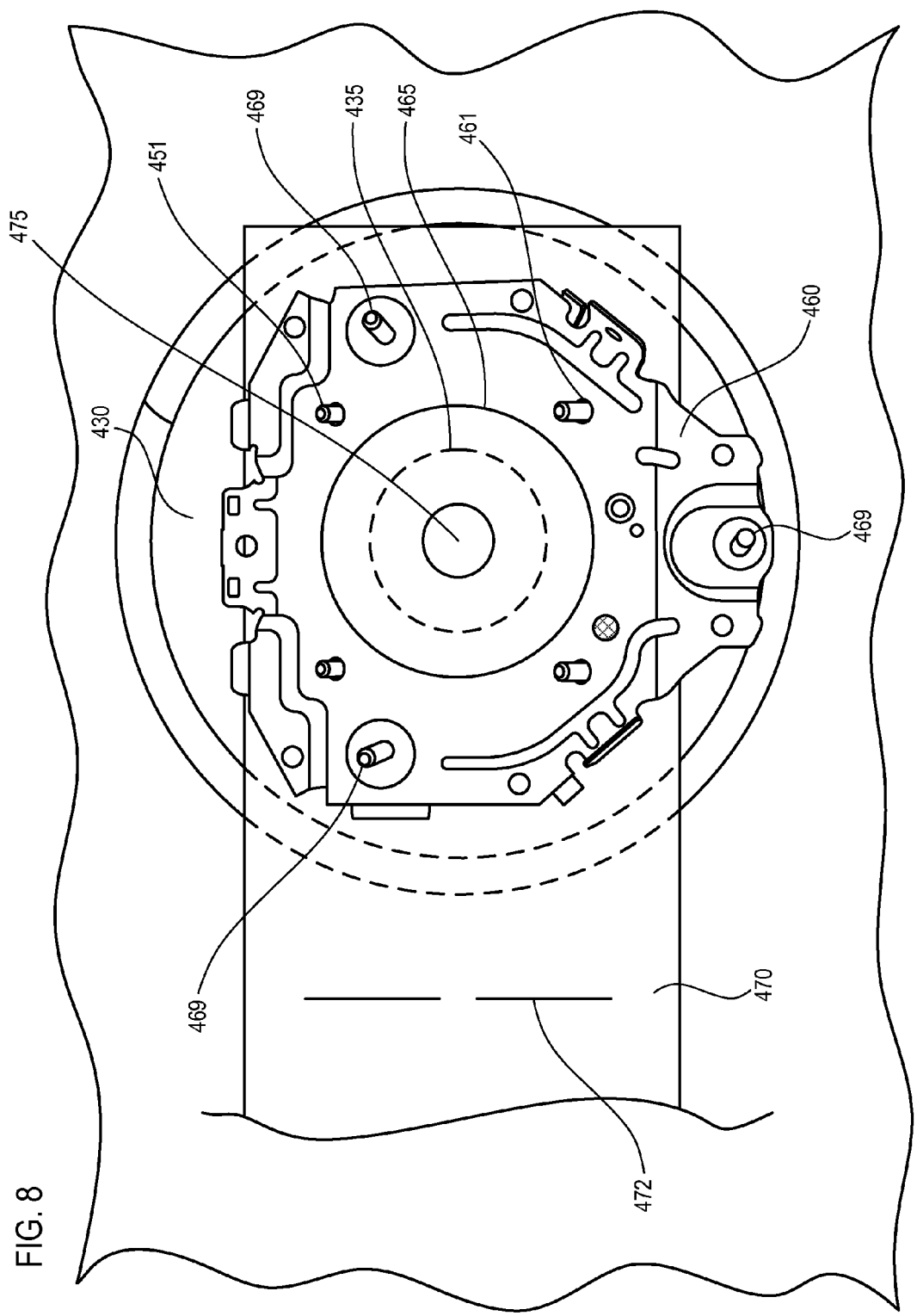

After flexible retainer 470 has been positioned adjacent to opening 435, preferably with opening 475 positioned concentrically within opening 435, a second frame member 460 may be positioned adjacent to flexible retainer 470, as depicted in FIG. 8. In the depicted embodiment, second frame member 460 comprises a plurality of openings 461 configured to receive studs 451 from first frame member 450. Thus, studs 451 from first frame member 450 may extend through airbag cushion 430, flexible retainer 470, and second frame member 460. Second frame member 460 may further comprise a plurality of secondary studs or fasteners 469, which may be used to couple the frame members 450/460 and/or inflator 420 with one or more additional components of a vehicle airbag assembly, such as a horn plate and/or a housing, such as an airbag module housing.

Second frame member 460 further comprises a central opening 465. In the depicted embodiment, central opening 465 is concentric with opening 435 of airbag cushion 430 and opening 475 of flexible retainer 470. In addition, as also shown in FIG. 8, opening 465 is preferably larger than opening 435, which, as discussed above, is preferably larger than opening 475. In addition, as discussed below, opening 465 is preferably larger than a maximum diameter of an inflator 420 used in assembly 400.

Figure 9:
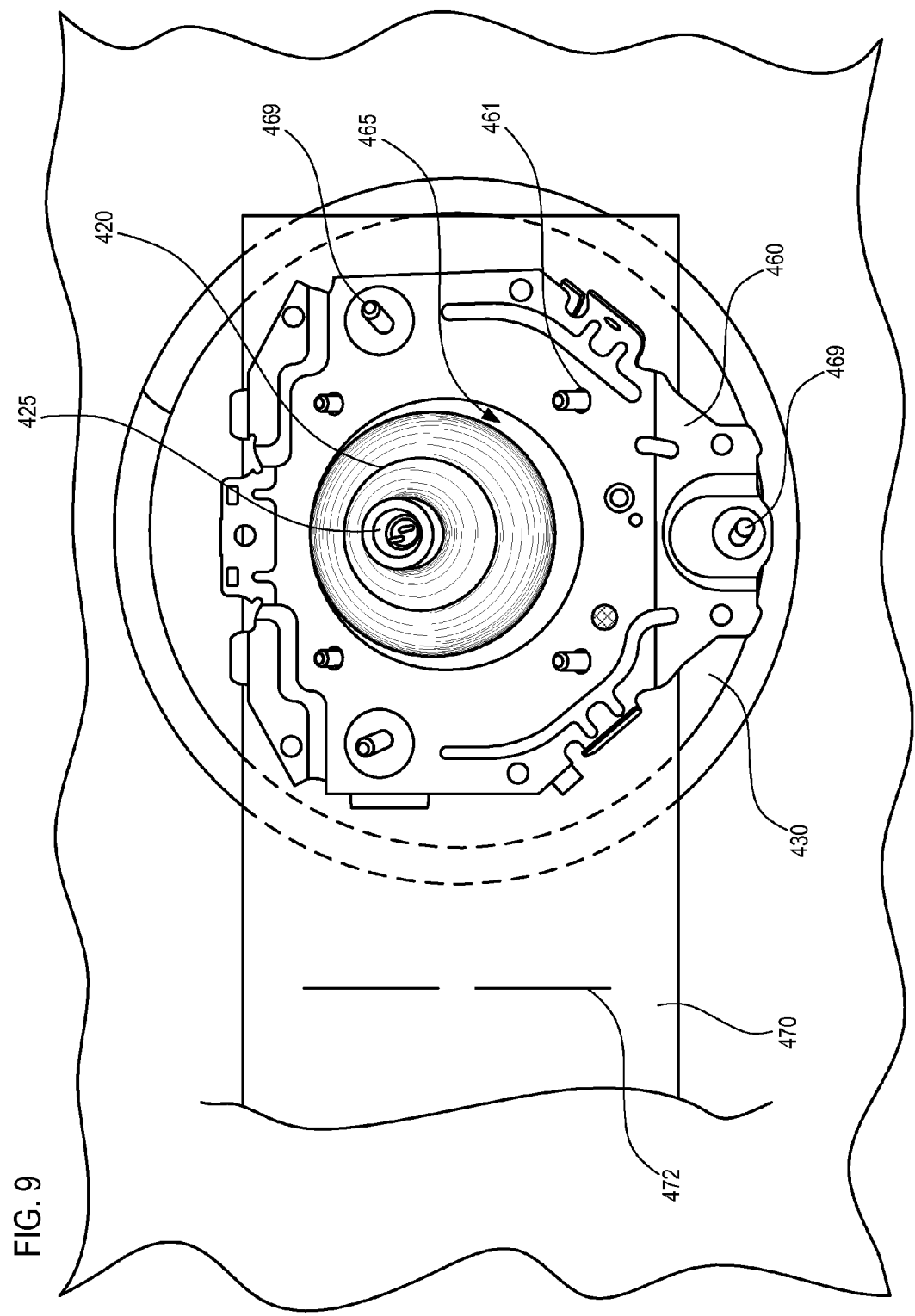

After second frame member 460 has been positioned as shown in FIG. 8, an inflator, such as a flangeless inflator 420, may be positioned within opening 465, as depicted in FIG. 9. In some embodiments, flangeless inflator 420 may comprise an overwrap formed about at least a portion of a subassembly of the inflator. This overwrap may be provided in order to facilitate withstanding the high pressures generated within a combustion chamber of the inflator upon reaction of the pyrotechnic material contained therein. In some embodiments, the overwrap may comprise a composite of fibers comprising at least one of glass, basalt, and a resin matrix system.

Preferably, inflator 420 comprises a maximum diameter or dimension that is less than that of opening 465. In this manner, inflator 420 may be nested within opening 465 and retained by flexible retainer 470, as mentioned above.

Figure 10:
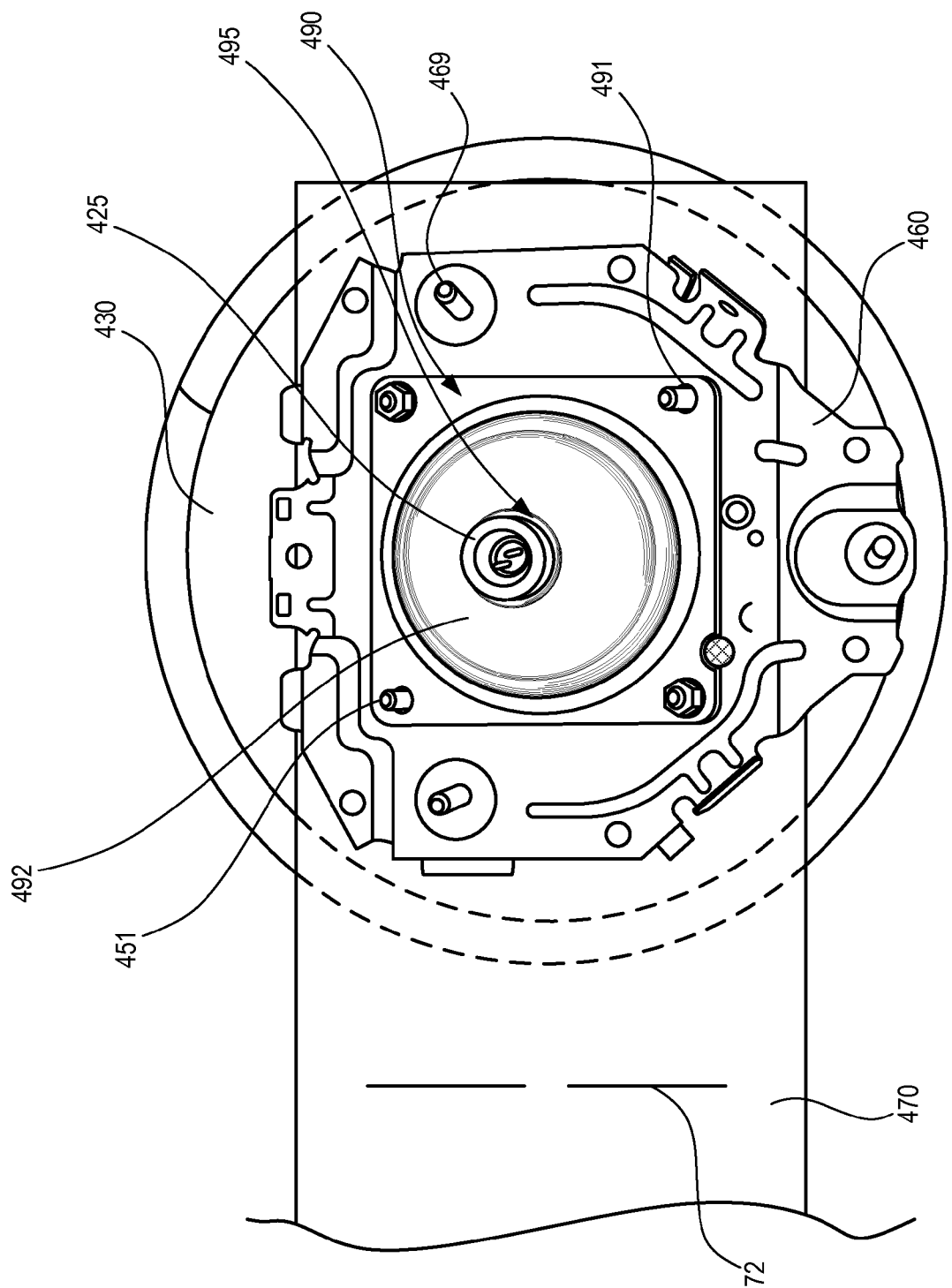

In some embodiments and implementations, the components depicted in FIG. 9 may be coupled with an airbag module housing directly. For example, the base 425 of inflator 420 may be inserted into an opening of such a housing, such as through opening 115 of housing 110 for example, to secure the inflator assembly to the housing. Alternatively, one or more additional assembly components may be used. For example, in some embodiments, an inflator retention plate 490 may be coupled with second frame member 460 such that inflator 420 is sandwiched between inflator retention plate 490 and flexible retainer 470, as depicted in FIG. 10. Inflator retention plate 490 may comprise openings 491 configured to receive studs 451 and may comprise a central opening 495 configured to receive an inflator base and/or initiator, such as base 425. Some embodiments may further comprise a shaped recess 492 configured to at least substantially match a shape of inflator 420.

Figure 11:
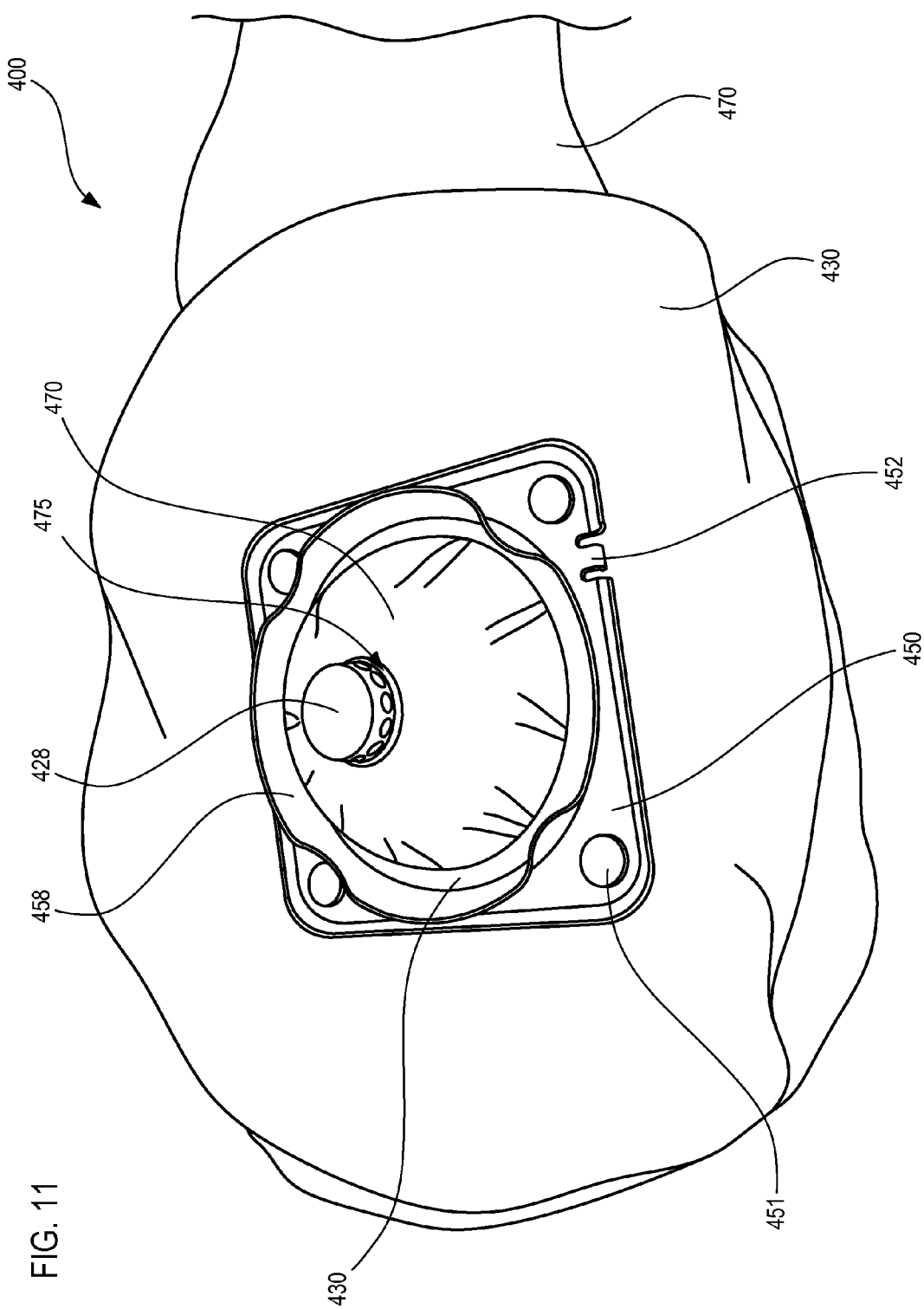
FIG. 11 is a perspective view of an interior of an airbag cushion of the vehicle airbag assembly of FIGS. 4-10 after the step depicted in FIG. 10.

As mentioned above, FIG. 9 depicts a flangeless inflator 420 nested within opening 465. FIG. 11 depicts the opposite side of vehicle airbag assembly 400 relative to that depicted in FIG. 9. More particularly, FIG. 11 depicts the interior of airbag cushion 430 after the nesting depicted in FIG. 9 has been performed. In this figure, it can be seen that diffuser 428 extends through opening 475 and fabric retainer 470 retains inflator 420 and prevents inflator 420 from extending into airbag cushion 430 by more than a predetermined amount according to the size, shape, and positioning of slots 471.

FIG. 11 also depicts a side of first frame member 450 opposite from that depicted in FIG. 4. This side of first frame member 450 may comprise a rim 458 that may extend around a perimeter of opening 455. Rim 458 may, in some embodiments, be used as a gas deflector. In some such embodiments, rim 458 may therefore extend around and above inflator 420 so as to deflect inflation gases exiting from the side cylindrical surface of diffuser 428. In addition, FIG. 11 depicts a portion of airbag cushion 430 around opening 435 being secured between first frame member 450 and fabric retainer 470.

Figure 12:
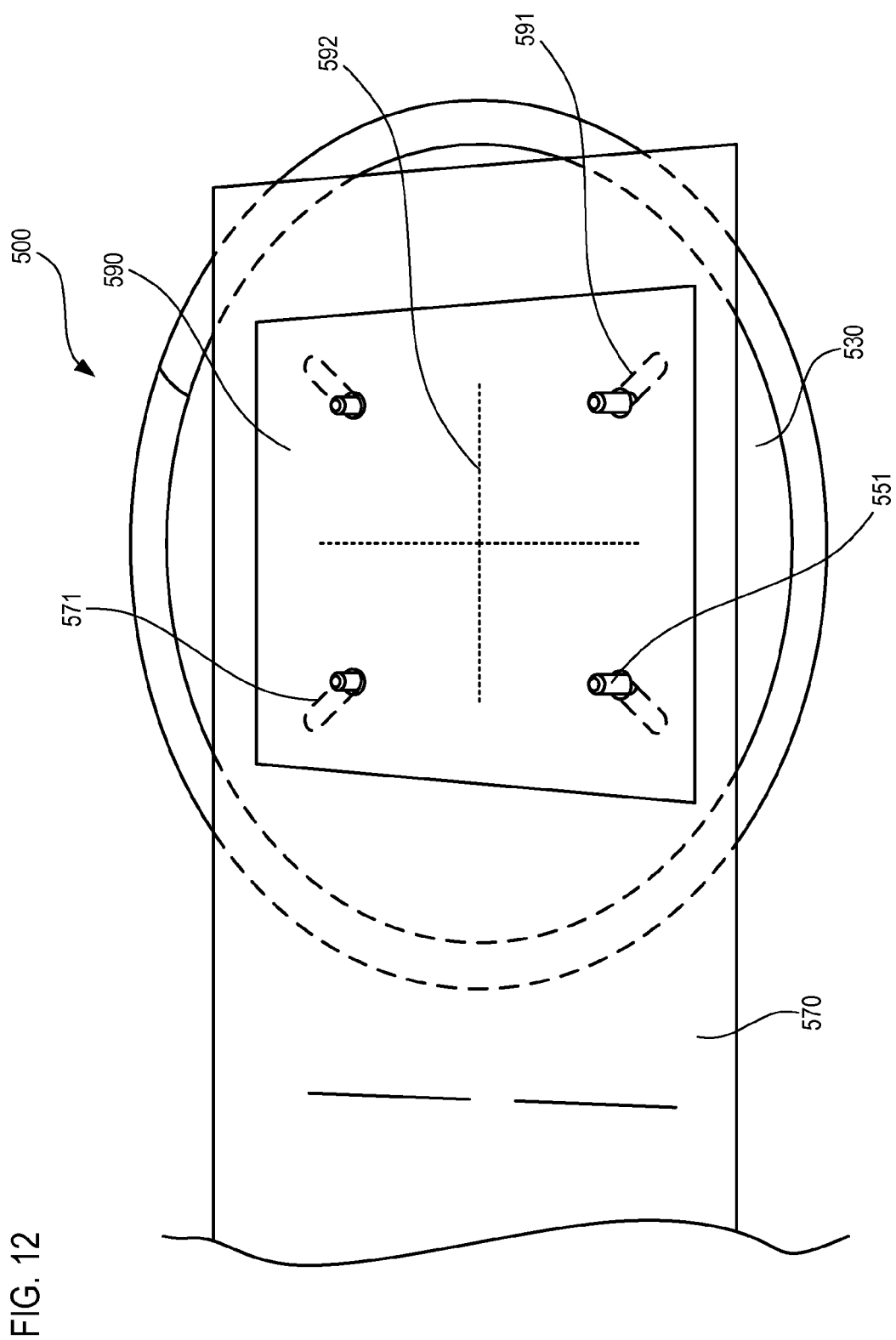
FIG. 12 depicts certain components of an alternative embodiment of a vehicle airbag assembly.

FIG. 12 depicts an alternative embodiment of a vehicle airbag assembly 500. FIG. 12 depicts a stage of manufacturing/assembly after that of FIG. 7 with respect to vehicle airbag assembly 400. Vehicle airbag assembly 500, like vehicle airbag assembly 400, comprises an airbag cushion 530 and a flexible retainer 570. Flexible retainer 570 comprises a plurality of elongated slots 571, each of which received a stud 551 of a first frame member (not shown in figure).

However, vehicle airbag assembly 500 further comprises a secondary flap 590 positioned over an opening (not visible in figure) in flexible retainer 570. Flap 590 may comprise a plurality of openings 591 corresponding with the plurality of fasteners/studs 551 such that the flap 590 may be received over studs 551 after fabric retainer 570. Flap 590 may be configured to open to expose a diffuser, such as diffuser 428, to an interior of airbag cushion 530 upon deployment of an inflator, such as inflator 420, so as to avoid restricting the flow of gas during deployment. As such, flap 590 may comprise a weakened portion 592 configured to separate upon deployment of the inflator. Flap 590 may serve the function of absorbing at least some of an initial load from an inflator and to thereby protect airbag cushion 530 during deployment.

In alternative embodiments, flap 592 may be attached, such as sewn or adhered, directly to fabric retainer 570. Thus, it is not necessary that flap 592 fit over studs 551.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A vehicle airbag assembly, comprising:
   a housing comprising a housing opening and a plurality of tab openings;
   an inflator comprising an inflator base positioned at a first end of the inflator and a diffuser positioned at a second end of the inflator opposite from the first end, wherein the inflator base is configured to be received in the housing opening, wherein the inflator base is configured to extend at least partially through the housing opening such that at least a portion of the inflator base extends out of the housing opening; and
   a unitary retainer piece configured to fit over the inflator at the second end of the inflator and secure the inflator to the housing with the inflator base positioned through the housing opening, wherein the retainer piece comprises:
      a retainer piece opening configured to receive the diffuser, wherein the retainer piece is configured to fit over the inflator at the second end of the inflator and secure the inflator to the housing with the inflator base positioned through the housing opening and the diffuser positioned through the retainer piece opening, and wherein the retainer piece opening is configured to allow the diffuser to pass therethrough such that the entire diffuser extends through and outside of the retainer piece; and
      a plurality of tabs configured to be received in the tab openings to secure the inflator in place between the housing and the retainer piece.

2. The vehicle airbag assembly of claim 1, wherein the inflator comprises a flangeless inflator.

3. The vehicle airbag assembly of claim 1, wherein the tabs are configured to be bent against the housing after being received in the tab openings to secure the inflator between the housing and the retainer piece.

4. A vehicle airbag assembly, comprising:
   a housing comprising a housing opening;
   an airbag cushion positioned within the housing;
   an inflator comprising an inflator base positioned at a first end of the inflator and a diffuser positioned at a second end of the inflator opposite from the first end, wherein the inflator base is configured to be received in the housing opening, wherein the inflator base is configured to extend at least partially through the housing opening such that at least a portion of the inflator base extends out of the housing opening; and
   a retainer comprising a retainer opening configured to receive the diffuser therethrough, wherein the retainer is configured to fit over the inflator at the second end of the inflator and secure the inflator to the housing with the inflator base positioned through the housing opening and the diffuser positioned through the retainer opening, wherein the airbag cushion is positioned in between the inflator and the retainer such that a portion of the airbag cushion contacts the inflator on a first side of the airbag cushion and contacts the retainer on a second side of the airbag cushion opposite from the first side, and wherein the retainer is configured to secure the inflator to the housing without use of stud fasteners.

5. The vehicle airbag assembly of claim 4, wherein the retainer comprises a fabric retainer.

6. The vehicle airbag assembly of claim 4, wherein the retainer comprises a retainer piece made up of a rigid material.

7. The vehicle airbag assembly of claim 6, wherein the housing further comprises a plurality of tab openings, and wherein the retainer piece further comprises a plurality of tabs configured to be received in the tab openings to secure the inflator in place between the housing and the retainer piece.

8. The vehicle airbag assembly of claim 4, wherein the inflator base comprises a collar having an at least substantially cylindrical shape.

9. The vehicle airbag assembly of claim 4, wherein the housing comprises an airbag module housing.

10. The vehicle airbag assembly of claim 1, wherein the diffuser comprises a plurality of diffuser openings, and wherein the retainer piece opening is configured to receive the diffuser such that at least a portion of the diffuser openings are positioned through the retainer piece opening.

11. The vehicle airbag assembly of claim 10, wherein the retainer piece opening is configured to receive the diffuser such that all of the diffuser openings are positioned through the retainer piece opening.

12. The vehicle airbag assembly of claim 4, wherein the retainer is configured such that the entire diffuser can extend through the retainer opening.

13. The vehicle airbag assembly of claim 1, wherein the inflator base comprises a collar, and wherein the collar is configured to extend fully through the housing opening such that the collar protrudes beyond a perimeter of the housing opening.

14. The vehicle airbag assembly of claim 1, wherein the retainer piece further comprises a shaped portion configured to receive and mate with a portion of the inflator, and wherein the shaped portion comprises a bowl shape configured to match the shape of the portion of the inflator.

* * * * *